June 10, 1969  L. J. WINDECKER  3,448,546
SHAPING APPARATUS
Filed Nov. 21, 1966

INVENTOR.
Leo J. Windecker
BY
Robert I. Ingraham
AGENT

United States Patent Office 3,448,546
Patented June 10, 1969

3,448,546
SHAPING APPARATUS
Leo J. Windecker, Midland, Tex., assignor to The Dow Chemical Company, Midland, Mich., a corporation of Delaware
Filed Nov. 21, 1966, Ser. No. 595,931
Int. Cl. B24b 5/26
U.S. Cl. 51—80                                6 Claims

ABSTRACT OF THE DISCLOSURE

Plastic foams are readily shaped using inexpensive shaping rolls prepared from plastic foam and using a thermosetting adhesive to carry an abrasive such as sand.

Figure 1:
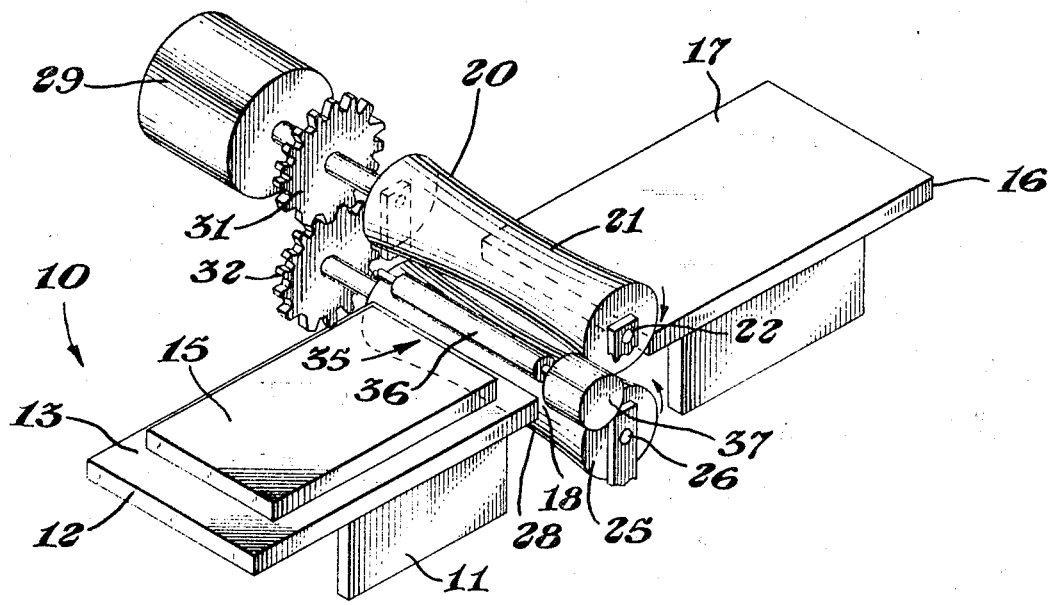

This invention relates to a shaping apparatus and more particularly relates to an apparatus especially suited and adapted for shaping of synthetic resinous foams and the like.

Oftentimes it is desirable to prepare synthetic resinous foams of either the rigid or flexible variety in shapes other than rectangular or cylindrical, which they are usually prepared by extrusion or casting. A wide variety of techniques are utilized to form synthetic resinous foams. Generally such foams can be formed by sawing, slicing, grinding and like techniques. Oftentimes, particularly in the cases of thermoplastic foams, for example, polystyrene foam, shaping is readily accomplished by means of cutting with a heated wire which causes the foam to melt. Frequently it is desirable to shape boards, planks or billets of synthetic resinous foams into an elongate body having a desired cross section. Generally, in order to achieve such an end with a reasonable degree of accuracy it is necessary to employ relatively expensive machinery such as a shaper, contour planer and mill or the like. Oftentimes the quantity of synthetic resinous foam desired to be shaped is substantially less than that which would justify such expensive and heavy equipment.

It would be particularly advantageous if there were available an apparatus which was particularly suited for the shaping of elongated synthetic resinous foam bodies which is simple in nature and readily constructed.

It would also be advantageous if there were available an improved apparatus for the shaping of synthetic resinous foam wherein the configuration of the resultant articles could be changed with minimal expense.

It would also be advantageous if there were available an improved foam shaping apparatus which could be prepared with a minimum investment of time, effort and capital, the apparatus being capable of producing a wide variety of shapes at a minimum of expense.

These benefits and other advantages in accordance with the present invention are achieved in the foam shaping apparatus. The foam shaping apparatus comprising in cooperative combination a support, the support carrying a first work receiving table and a second work receiving table, a first shaping roll and a second shaping roll disposed between the first and second work receiving tables, the first and second work shaping rolls being rotatably journaled to the support and defining therebetween a space, the space having a desired configuration, means to rotate the shaping rolls in opposite directions, the shaping rolls rotating in a direction tending to feed a workpiece toward the first work receiving table, each of the shaping rolls having disposed on the surface thereof a matrix of a hardened synthetic resinous material, and an exposed surface layer, the matrix having disposed therein an abrasive grit, at least a portion of the abrasive grit projecting from the surface of the shaping roll.

Further features and advantages of the present invention will become more apparent from the following specification when taken in connection with the drawing wherein:

In FIGURE 1 there is schematically depicted a foam shaping apparatus in accordance with the invention.

Figure 2:
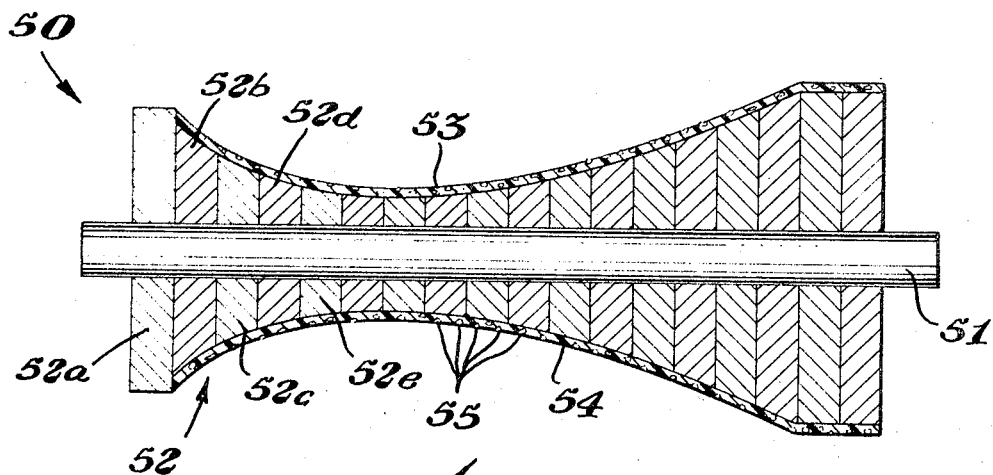

In FIGURE 2 there is depicted a cross sectional view of a shaping roll employed in the apparatus of the present invention.

In FIGURE 1 there is schematically depicted a foam shaping apparatus generally designated by the reference numeral 10. The apparatus 10 comprises in cooperative combination a frame or support means 11. The frame or support means 11 has a first work receiving table 12. The table 12 has an upper or workpiece receiving surface 13 of generally planar configuration. A workpiece 15 is disposed on the surface 13 of the table 12. A second workpiece receiving table 16 is generally oppositely disposed from the first workpiece receiving table 12, the table 16 has a work receiving surface 17. The tables 12 and 16 are in spaced apart relationship and define a gap or space 18 therebetween. A first foam shaping roll 20 is rotatably mounted to the frame 11 by means of suitable bearings. The roll 20 is adapted to rotate in a direction indicated by the arrow. The roll 20 has a surface of rotation 21 having the configuration in an axial plane of at least a first surface of the cross-sectional configuration desired on a workpiece to be passed therethrough. The roll 20 is supported by means of the shaft 22. A second roll 25 having a shaft 26 is rotatably supported on the frame 11 in the position generally parallel to the roll 20. The roll 25 has a curved surface 28 having a configuration generally similar to the desired configuration in an axial plane of the second surface of the workpiece. A driving means or motor 29 is in operative combination with the shaft 22. The shaft 22 is connected to the shaft 26 by the driving means 31 and 32 which beneficially may be friction gearing, spur gears, helical gears or the like. The rolls 20 and 25 rotate in such a manner that they tend to feed a workpiece from the second table 16 toward the first table 12. A workpiece feed assembly 35 is disposed adjacent the rolls 20 and 25 and the first table 12. The feed assembly 35 comprises a feed roll 36 adapted to frictionally engage a workpiece, the feed roll 36 rotates in the direction indicated by the arrow and tends to feed a workpiece between the counter-rotating rolls 20. The feed roll 36 is driven by means of a motor or driving means 37.

In operation of the apparatus with FIGURE 1 a workpiece such as the workpiece 15 is disposed upon the surface 13 of table 12. The feed roll 36 engages the workpiece 15 forcing it at a predetermined rate between the rotating rolls 20 and 25 thereby abrading exposed surfaces of the foam workpiece 15 and causing the workpiece 15 to conform to the configuration of the gap of the rolls 20 and 26. The particular relative rate of speed of the abrading rolls 20 and 25 and feed roll 36 are dependent on the particular variety of grit on the surface of the rolls 20 and 25 and the cutting characteristics of the foam. Generally it is well if the surface speed of the rolls 20 and 25 exceeds that of the feed roll by a factor of about 100.

In FIGURE 2 there is depicted a sectional view of a roll suitable for use in the apparatus of FIGURE 1 generally designated by the reference numeral 50. The roll 50 comprises a shaft 51, the shaft 51 has disposed thereon a body generally designated by the reference numeral 52. The body 52 has an external surface of rotation 53. Beneficially the body 52 is prepared from a plurality of discoidal elements 52a, 52b, 52c, 52d, 52e, etc. Advantageously the discoidal elements are each adhered to adjacent elements and to the shaft 51. A synthetic resinous matrix 54 is disposed on the surface 53 or the roll 50. Matrix 54 carries a plurality of abrasive particles 55 adapted to abrade the foam to a desired configuration.

Advantageously shaping rolls of the apparatus of the present invention are readily and easily prepared from a wide variety of materials. For example, the discoidal elements such as 52a, 52b, 52c, 52d, 52e, etc., may be of wood, synthetic resin, synthetic resinous foam, fiber insulation, such as fiberboard, chipboard, plywood, pine, and the like. Generally the force exerted upon the shaping rolls is insufficient to cause deformation even of synthetic resinous materials such as foamed polystyrene having a compressive strength of about 25 pounds per square inch. However, when employing thermo-plastic materials such as foamed polystyrene care must be taken in order to provide adequate cooling in order that the heat distortion temperature of the foam is not exceeded. Beneficially such known thermoplastic foams as foamed phenol-formaldehyde and rigid foamed urethane resins are beneficially employed for the preparation of the rolls. Such rolls can be readily fabricated by the utilization of discs as depicted in FIGURE 2 or alternately may be quickly formed from a billet of foam material adhered to a shaft such as the shaft 51. By the use of a template the desired external curvature of the roll is readily obtained as the roll is turned to shape by either cutting or suitable abrasive means. Once the desired configuration of the roll is obtained a coating of suitable material is then applied. For example, epoxy resins or adhesives are advantageously employed to coat the exadmixed with epoxy resin or dusted to epoxy resin is partially set, the surface is then dusted with a suitable abrasive material, for example, for cutting polystyrene or rigid polyurethane foams, common beach sand either admixed with epoxy resin or dusted to epoxy resin is found eminently satisfactory. Alternately any desired binder may be employed. Usually, however, it is preferred to employ a binder for the abrasive grit which is nonthermoplastic in order that undesirable deformation does not occur when the apparatus is in operation on more dense foams. When employing a wooden core such as might be prepared from plywood and the like, such binders as phenol-formaldehyde, linseed oil, urea-formaldehyde resins and the like the found eminently satisfactory.

Generally, if desired, the shaping rolls of the present invention may be varied in external configuration by removing the portion of the abrasive coating if necessary to reduce the diameter of the coating and remove a portion of the underlying support and subsequent recoating. If the rolls tend to be somewhat undersize and filling is necessary this is readily accomplished using fabric and adhesive such as glass cloth and epoxy resin or alternately by disposing a foaming in place resin such as the foam-in-place rigid urethane resins which can be trowled on or mixed and subsequently turned to the desired diameter and a fresh abrasive coating applied. The particular nature of abrasive employed in the practice of the present invention generally is not critical in that the synthetic resinous foams are usually much softer than any of the commonly available abrasives. For example, polystyrene foam and rigid polyurethane foam as well as rigid phenol-formaldehyde foams are readily shaped employing an epoxy resin matrix and beach sand as an abrasive, alternately aluminum oxide, crystalline calcium carbonate and silicon carbide are also satisfactory. Generally it is unecessary to employ harder abrasives such as aluminum oxide or silicon carbide as the rate of wear of the softer abrasives such as beach sand or crystalline calcium carbonate is very low and at such time as the abrasives become worn it may be rapidly replaced by applying a fresh coat of a rapidly curing epoxy resin either containing abrasive or by dusting the abrasive on a freshly coated roll. Spacing of the rolls readily compensates for the added thickness of a new coat of abrasive. For most applications it is desirable to enclose the roll within an exhaust hood to remove dust generated during shaping operations.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A foam shaping apparatus, the foam shaping apparatus consisting essentially of, in cooperative combination, a support, the support carrying a first work receiving table and a second work receiving table, a first shaping roll and a second shaping roll disposed between the first and second work receiving tables, the first and second work shaping rolls being rotatably journaled to the support, the rolls defining therebetween a space, the space having a desired cross sectional configuration, means to rotate the shaping rolls in opposite directions, the shaping rolls rotating in a direction tending to feed a workpiece toward the first work receiving table, each of the shaping rolls having disposed on the surface thereof a matrix of a hardened synthetic resinous material, each of the rolls having an exposed surface layer of the matrix material having disposed therein an abrasive grit, at least a portion of the abrasive grit projecting from the surface of the shaping roll, each of the rolls comprising a shaft having supported thereon a composite foam plastic body comprising a plurality of foam plastic segments adhered together to form a unitary body.

2. The apparatus of claim 1 including a feed roll disposed adjacent to first and second shaping rolls, the feed roll being in spaced relationship to the first work receiving table and remote from the second work receiving table and adapted to frictionally engage a work piece disposed on the first work receiving table, means to rotate the feed roll and force a workpiece between first and second shaping rolls toward the second table.

3. The apparatus of claim 1 wherein the foam plastic body comprises a plurality of discoidal segments.

4. The apparatus of claim 1 wherein the synthetic resinous matrix is a thermosetting resin.

5. The apparatus of claim 4 wherein the matrix is an epoxy resin.

6. The apparatus of claim 4 wherein the abrasive grit is sand.

References Cited

UNITED STATES PATENTS

| | | | |
|---|---|---|---|
| 421,953 | 2/1890 | Mattullath | 51—87 |
| 2,036,197 | 4/1936 | Chormann | 51—207 |
| 3,166,874 | 1/1965 | Bottcher | 51—87 |
| 3,307,297 | 3/1967 | Lawson | 51—80 |
| 3,364,630 | 1/1968 | Rusk | 51—358 |

HAROLD D. WHITEHEAD, *Primary Examiner.*

U.S. Cl. X.R.

51—87, 207, 358

PO-1050
(5/69)

UNITED STATES PATENT OFFICE
CERTIFICATE OF CORRECTION

Patent No. 3,448,546          Dated June 10, 1969

Inventor(s) Leo J. Windecker

It is certified that error appears in the above-identified patent and that said Letters Patent are hereby corrected as shown below:

Column 3, line 31, after "ex-" insert -- ternal surface of a roll. At such a time as the resins are partially set, the surface is then dusted with a suitable abrasive material, for example, for cutting polystyrene or rigid polyurethane foams, common beach sand either --; lines 33, 34 and 35 strike out "partially set, the surface is then dusted with a suitable abrasive material, for example, for cutting polystyrene or rigid polyurethane foams, common beach sand either".

SIGNED AND
SEALED
MAR 24 1970

(SEAL)
Attest:

Edward M. Fletcher, Jr.
Attesting Officer

WILLIAM E. SCHUYLER, JR
Commissioner of Patents